United States Patent
Koletzki et al.

(10) Patent No.: US 11,187,108 B2
(45) Date of Patent: Nov. 30, 2021

(54) GUIDE VANE ASSEMBLY WITH SEALING ELEMENT

(71) Applicant: Rolls-Royce Deutschland Ltd & Co KG, Blankenfelde-Mahlow (DE)

(72) Inventors: Robert Koletzki, Berlin (DE); Thomas Klauke, Luebbenau/Spreewald (DE); Pablo Iribarren, Berlin (DE)

(73) Assignee: ROLLS-ROYCE DEUTSCHLAND LTD & CO KG, Blankenfel de-Mahlow (DE)

( * ) Notice: Subject to any disclaimer, the term of this patent is extended or adjusted under 35 U.S.C. 154(b) by 108 days.

(21) Appl. No.: 16/538,405

(22) Filed: Aug. 12, 2019

(65) Prior Publication Data
US 2020/0049029 A1 Feb. 13, 2020

(30) Foreign Application Priority Data
Aug. 13, 2018 (DE) .................. 102018213604.1

(51) Int. Cl.
*F01D 9/04* (2006.01)
*F01D 25/16* (2006.01)
(Continued)

(52) U.S. Cl.
CPC ........... *F01D 25/166* (2013.01); *F01D 9/041* (2013.01); *F01D 9/042* (2013.01); *F01D 17/162* (2013.01); *F02C 7/042* (2013.01); *F02C 7/06* (2013.01); *F04D 29/563* (2013.01); *F16C 33/74* (2013.01); *F05D 2240/50* (2013.01);
(Continued)

(58) Field of Classification Search
CPC ........ F01D 9/041; F01D 9/042; F01D 17/162; F01D 25/166; F16C 33/74; F16C 2360/23; F02C 7/042; F02C 7/06; F02C 7/28; F04D 29/563; F05D 2240/50; F05D 2240/55; F05D 2250/90
See application file for complete search history.

(56) References Cited

U.S. PATENT DOCUMENTS 3,674,377 A * 7/1972 Trappmann ........... F01D 17/162
415/147
5,319,580 A 6/1994 Sakata et al.
(Continued)

FOREIGN PATENT DOCUMENTS

DE 102016215807 3/2018

OTHER PUBLICATIONS

German Search Report dated Mar. 18, 2019, from Counterpart German App#DE102018213604.1.

*Primary Examiner* — Ninh H. Nguyen
(74) *Attorney, Agent, or Firm* — Shuttleworth & Ingersoll, PLC; Timothy Klima

(57) ABSTRACT

The proposed solution relates to a stator vane assembly for an engine, having at least one stator vane of a stator vane row and a casing for the at least one stator vane row, wherein the at least one stator vane is mounted adjustably on the casing by means of a bearing journal, which is rotatably mounted in a bearing opening in the casing and passes through this bearing opening along a longitudinal axis.
A section of a sealing element, on which at least one sealing ridge extending radially in relation to the longitudinal axis is formed and/or which has a nonlinear slot passing longitudinally through the section, is provided within the bearing opening.

15 Claims, 9 Drawing Sheets

(51) Int. Cl.
   *F01D 17/16*   (2006.01)
   *F16C 33/74*   (2006.01)
   *F02C 7/042*   (2006.01)
   *F04D 29/56*   (2006.01)
   *F02C 7/06*    (2006.01)

(52) U.S. Cl.
   CPC ...... *F05D 2240/55* (2013.01); *F05D 2250/90* (2013.01); *F16C 2360/23* (2013.01)

(56) References Cited

U.S. PATENT DOCUMENTS

| | | | |
|---|---|---|---|
| 5,324,165 A * | 6/1994 | Charbonnel | F01D 11/003 415/160 |
| 6,086,327 A | 7/2000 | Mack et al. | |
| 6,386,763 B1 * | 5/2002 | Mack | F01D 17/162 384/272 |
| 8,038,387 B2 * | 10/2011 | Houradou | F01D 17/162 415/160 |
| 8,496,430 B2 * | 7/2013 | Kilminster | F01D 17/162 415/160 |
| 8,858,165 B2 * | 10/2014 | Peck | F16C 33/04 415/160 |
| 9,309,778 B2 | 4/2016 | Ress, Jr. | |
| 9,765,818 B2 * | 9/2017 | Astner | F16C 33/046 |
| 2003/0170115 A1 | 9/2003 | Bowen et al. | |
| 2018/0058231 A1 | 3/2018 | Tomisk | |

* cited by examiner

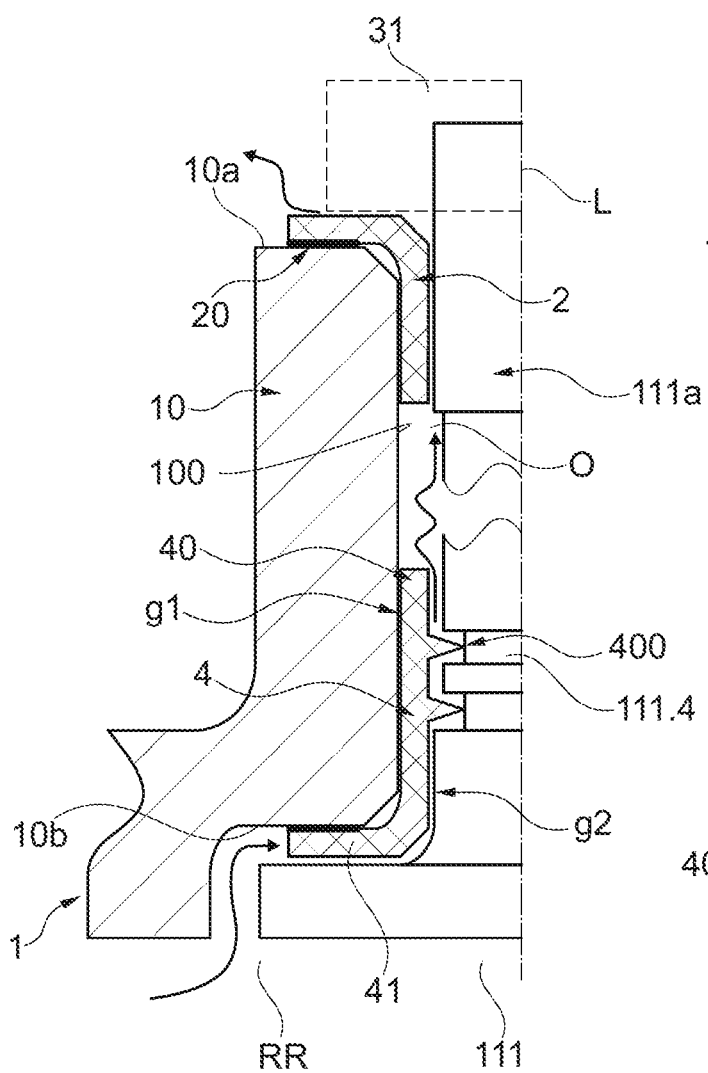
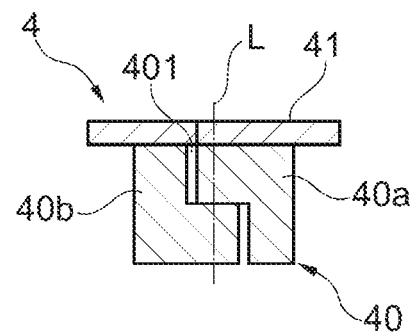
Fig. 1B
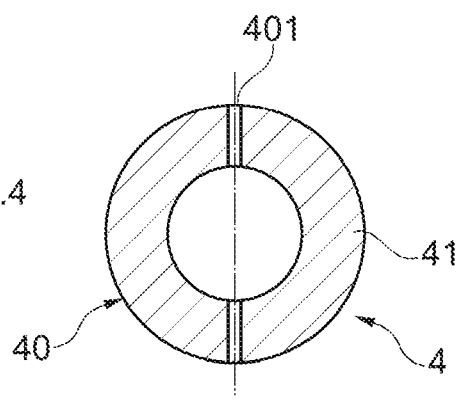
Fig. 1C
Fig. 1A

GUIDE VANE ASSEMBLY WITH SEALING ELEMENT

This application claims priority to German Patent Application DE102018213604.1 filed Aug. 13, 2018, the entirety of which is incorporated by reference herein.

The proposed solution relates to a stator vane assembly for an engine.

The provision of variable stator vanes to influence the flow in accordance with the speed and external temperature of rotating rotor blades in engines, e.g. turbomachines and, in particular, gas turbine engines, is a matter of common knowledge. Particularly in the case of gas turbine engines, variable stator vanes are usually employed in the region of the compressor, wherein the stator vanes can be adjusted in accordance with the compressor speed. In English technical jargon, the abbreviation "VSV" is used for the variable stator vanes.

Here, the variable stator vanes are usually part of a stator vane row and are arranged within a casing, in which the rotating rotor blades are also arranged. In this case, the individual stator vanes are in practice each mounted adjustably on the casing by means of a bearing journal. Rotatable mounting of a stator vane on a hub, e.g. that of a compressor, is usually provided within the casing. Each bearing journal is rotatably mounted on the casing in an associated bearing opening in the wall of the casing. In this arrangement, the bearing journal passes through this bearing opening along a longitudinal axis, and therefore one end of the bearing journal is accessible on an outer side of the casing to enable the corresponding stator vane to be adjusted by rotating the bearing journal. In this case, a respective lever usually engages on one journal end, which is secured on an adjusting ring of an adjusting mechanism in order to adjust a plurality of stator vanes simultaneously by adjusting the adjusting ring and a plurality of levers articulated thereon. A stator vane assembly of the type in question having variable stator vanes for a compressor of a gas turbine engine is shown by U.S. Pat. No. 9,309,778 B2, for example.

In practice, the bearing journals of the stator vanes, which are also often referred to as spindles, are provided in radially projecting sleeve-shaped bearing extensions of the casing. These bearing extensions are formed on a wall of the casing and ensure rotatable mounting and support for the bearing journals.

In practice, a leakage flow to the outside through the bearing opening arises within the bearing opening owing to the component tolerances provided, wear during operation and the need to provide a clearance between the bearing journal and, for example, a bearing bush by means of which the bearing journal is rotatably mounted in the bearing opening. Such a leakage flow reduces the mass flow in the core engine.

It is therefore the object of the proposed solution to make available a stator vane assembly which is improved in this respect.

This object is achieved by a stator vane assembly according to the resent disclosure.

According to this, a stator vane assembly for an engine is proposed, comprising at least one stator vane of a stator vane row and a casing for the at least one stator vane row. The at least one stator vane is mounted adjustably on the casing by means of a bearing journal, which is rotatably mounted in a bearing opening in the casing and passes through this bearing opening along a longitudinal axis. A section of a sealing element, on which at least one sealing ridge extending radially in relation to the longitudinal axis is formed and/or which has a nonlinear slot passing longitudinally through the section, is provided within the bearing opening.

According to the proposed solution, a sealing element for sealing the bearing opening with the bearing journal mounted adjustably therein is thus provided, said sealing element being configured in accordance with two aspects, which are different but can be combined. On the one hand, the sealing element can have a section on which at least one sealing ridge extending radially in relation to the longitudinal axis is formed in order thereby to reduce or avoid a leakage flow to the outside through the bearing opening along the bearing journal. On the other hand, particularly for easier assembly and to enable temperature-induced expansion of the sealing element, it is possible, along the circumferential direction and in the radial direction, for the sealing element to have a slot passing longitudinally through the sealing element section provided within the bearing opening. In this case, this slot does not extend in a straight line and therefore linearly, parallel to the longitudinal axis of the bearing opening; on the contrary, it has a nonlinear path, thereby avoiding or at least considerably reducing a leakage flow via the slot. Through the provision of at least one radially projecting sealing ridge and by means of the nonlinear slot on a sealing element, it is possible in each case to provide a kind of labyrinth seal within the bearing opening along the longitudinal axis of the bearing journal.

Thus, for example, it is envisaged that the section of the sealing element which is provided within the bearing opening forms a labyrinth seal in order to reduce or avoid a leakage flow through the bearing opening and along the bearing journal. In accordance with the above explanations, this labyrinth seal can be (co-)defined by the at least one radially extending sealing ridge and/or the nonlinear slot within the sealing element. Even in the case of a single-part design of the sealing element, a longitudinally slotted sealing element in this case allows mounting on the bearing journals of the stator vane by expanding the sealing element. As an alternative, a two-part sealing element (in particular with at least one radially extending sealing ridge) can be provided in order to facilitate or even to allow mounting on the bearing journals or stator vane.

In the case of a two-part or, more generally, multi-part embodiment of the sealing element, the at least one nonlinear slot passing longitudinally through the sealing element can separate two parts of the sealing element, e.g. two halves of a bush-shaped sealing element. Two parts of the sealing element thus adjoin one another along the slot. In particular, the nonlinear path of the slot on the mounted sealing element enables sections of two parts of a multi-part sealing element to overlap one another.

In a variant embodiment, at least two sealing ridges, which are arranged in series along the longitudinal axis, are formed on the section of the sealing element which is provided within the bearing opening. In this way, it is also possible, for example, to provide three or more and, in one variant embodiment, a maximum of five, radially extending sealing ridges in series along the longitudinal axis within the bearing opening. In this case, it is also possible, in particular, for two or more sealing ridges to be formed on the sealing element. A further sealing element, likewise having at least one radially extending sealing ridge, may additionally be provided within the bearing opening in order to provide at least three and/or a maximum of five radially extending sealing ridges arranged in series along the longitudinal axis within the bearing opening.

In one variant embodiment, the at least one radially extending sealing ridge of a sealing element section provided within the bearing opening has a taper in the direction of the bearing journal in at least one ridge section. Such a taper can be of wedge-shaped or arrow-shaped design, for example. By means of the taper at the end of the radially extending sealing ridge, a kind of narrow sealing lip is formed, which can be in frictional contact with the adjustable bearing journal.

In one variant embodiment, the at least one radially extending sealing ridge extends into a recess in the bearing journal. Thus, a radially recessed section is provided on the bearing journal, and thus a depression, aperture or gap is formed on the bearing journal. The radially extending sealing ridge then extends into this radially recessed section. When viewed along the longitudinal axis of the bearing journal, any air flow along the longitudinal axis is thus deflected several times, thus making it possible to reduce or even avoid a relevant leakage flow through the bearing opening in an effective manner.

In principle, the at least one radially extending sealing ridge can have an end region which rests in frictional engagement against an outer lateral surface of the bearing journal and which is provided for the purpose of being rubbed off at least partially by the adjustment of the bearing journal around the longitudinal axis during the operation of the engine. Thus, in this variant, the radially extending sealing ridge of the sealing element is designed in such a way that the radially extending sealing ridge rests in frictional engagement against the outer lateral surface of the bearing journal and an optimum clearance, in which part of the in-contact end region of the sealing ridge is rubbed off by the adjustment of the bearing journal, is established during the operation of the engine. Such an end region can then also have a tapering ridge section, for example.

In an alternative variant embodiment, the section formed with the at least one radially extending sealing ridge is accommodated in a recess in the bearing journal. Here, the at least one sealing ridge then extends radially outward in the direction of an inner lateral surface of the bearing opening. The sealing ridge can thus also optionally make frictional contact, but in that case against the inner lateral surface of the bearing opening, if the sealing element is held rotatably within the bearing opening together with the bearing journal. Such a variant embodiment of the sealing element, which is accommodated in a recess in the bearing journal, is recommended, for example, for a bush-shaped configuration of the sealing element and for an arrangement of the sealing element in a central region within the bearing opening, with the result that the sealing element does not project by one section from the bearing opening.

As an alternative to this, in addition to the section formed with the at least one radially extending sealing ridge, the sealing element can have a bearing section, via which the sealing element rests against a rim surface of the casing, said surface being situated radially on the inside in relation to a central axis of the stator vane row of the at least one stator vane and forming a boundary of the bearing opening. Such a bearing section is formed, for example, by a collar-shaped web or bush rim, which rests against the inner rim surface of the casing and from which a stem section having at least one sealing ridge extends into the bearing opening.

By means of the sealing element bearing section resting against the rim surface, a defined position of the sealing element relative to the bearing opening is ensured in a simple manner here. It is also optionally possible for the sealing element to be fixed on the rim surface of the casing and to rest in a sealing manner against the rim surface by means of the bearing section. In this way, a leakage flow to the outside from the interior of the casing via a clearance between the sealing element and an inner lateral surface of the bearing opening can be avoided. For example, the bearing section can be connected in a sealing manner to the inner rim surface of the casing by means of an adhesive bond.

In one variant embodiment, at least two sealing elements are provided, on each of which a section is provided within the bearing opening, on which section at least one sealing ridge extending radially in relation to the longitudinal axis is formed and/or which has a nonlinear slot passing longitudinally through the section. Thus, two mutually separate sealing elements are provided for sealing the bearing opening and the stator vane bearing journal mounted adjustably therein, and these can thus be arranged at different positions along a longitudinal axis in order to avoid a leakage flow in an effective manner.

In principle, a sealing element can be of bush-shaped or disk-shaped design. In particular, this includes the sealing element being designed as a sealing washer with or without a radially extending sealing ridge, but instead being formed with the nonlinear slot passing longitudinally through the sealing washer.

The nonlinear slot passing longitudinally through the section of the sealing element which is provided within the bearing opening can have a path which is discontinuous in a mathematical sense. Thus, the nonlinear and, in particular, discontinuous slot ensures that sections of the sealing element overlap one another axially, at least partially, and/or engage in one another in the circumferential direction and hence that a leakage flow through the slot is avoided or at least considerably reduced, despite the possibility provided by the slot of assembly-related and temperature-induced expansion, in particular opening out of the sealing element. A flow arising within the slot would consequently be deflected at least once, possibly even at least twice, thereby considerably reducing the probability of flow through the slot due to the prevailing pressure differences between a casing interior accommodating the stator vane row and an external space. Although the slot thus provides the possibility that the sealing element can be expanded during assembly, in particular in the section to be accommodated within the bearing opening, in order to be able to mount the sealing element on the bearing journal, and that the sealing element can readily expand when the sealing element is heated to a significant extent during the operation of the engine, a sealing effect of the sealing element along the longitudinal axis is not reduced or hardly reduced by the slot by virtue of the nonlinear path of the slot.

In principle, the sealing element can be designed in such a way that the sealing element rests against and thus seals the inner wall of the bearing opening, that is to say, for example, a casing bore, via an outer lateral surface under the thermal conditions which arise during the operation of the engine. Particularly in the case of an annular sealing element, thermal expansion in the circumferential direction and radially inwards can occur. If the bearing journal is provided with a recess in which the slotted sealing element is positioned, an overlap with the sealing element arises when viewed in the axial direction, and this has a sealing effect, in particular a sealing effect under all (transient) thermal conditions. In this context, the longitudinally extending slot is designed to compensate the thermal behavior and nevertheless to provide sealing in addition.

The nonlinear slot passing longitudinally through the section of the sealing element which is provided within the bearing opening has a helical, Z-, V- or Ω-shaped path, for example.

The proposed solution furthermore also relates to a gas turbine engine having a proposed stator vane assembly. In particular, a gas turbine engine having a stator vane assembly in which the bearing journals of all the stator vanes are provided within the respective bearing opening with a sealing element configured as proposed for the avoidance of a leakage flow can be provided.

The appended figures illustrate exemplary possible variant embodiments of the proposed solution.

In the figures:

FIG. 1A shows a detail of one variant of a proposed stator vane assembly in the region of a bearing opening of a casing, wherein a stator vane bearing journal held rotatably in the bearing opening is provided by means of a bush-shaped sealing element with a plurality of (at least two) rows of radially extending sealing ridges;

FIG. 1B shows a side view of the bush-shaped sealing element, illustrating, in particular, a Z-shaped slot passing longitudinally through a stem section of the sealing element;

FIG. 1C shows a plan view of the bush-shaped sealing element in FIGS. 1A and 1B;

Figure 7:
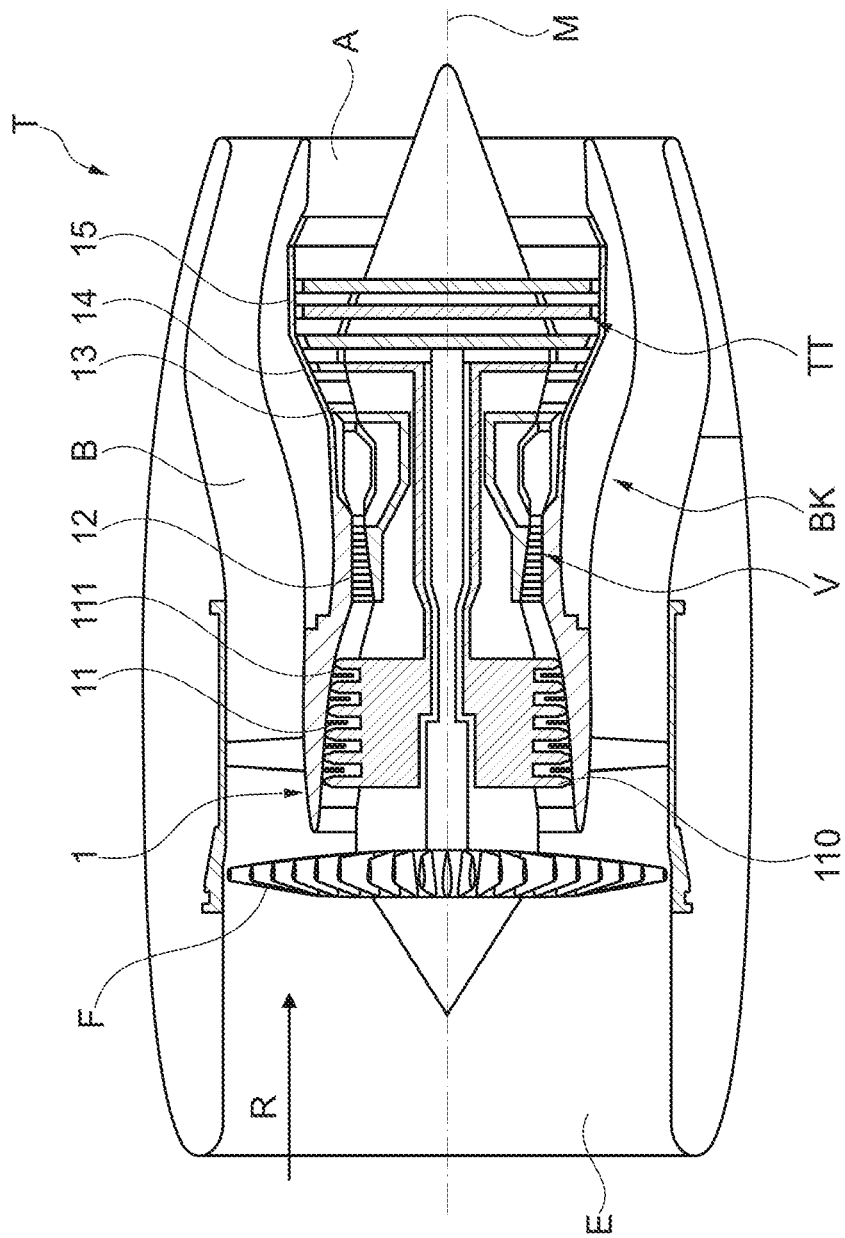
FIG. 7 shows, in a schematic sectional illustration, a gas turbine engine in which at least one stator vane assembly according to the invention is used.

FIG. 7 illustrates, schematically and in a sectional illustration, a (gas turbine-) engine T in the form of a turbofan engine, in which the individual engine components are arranged one behind the other along a central axis or axis of rotation M. At an inlet or intake E of the engine T, air is drawn in along an inlet direction E by means of a fan F. This fan F is driven via a connecting shaft, to which rotation is imparted by a turbine TT. Here, the turbine TT adjoins a compressor V, which comprises for example a low-pressure compressor 11 and a high-pressure compressor 12, and possibly also a medium-pressure compressor. On the one hand, the fan F feeds air to the compressor V and, on the other hand, feeds air to a secondary-flow or bypass duct to generate the thrust. Finally, the air delivered via the compressor V enters a combustor section BK, in which the driving energy for driving the turbine TT is generated. For this purpose, the turbine TT has a high-pressure turbine 13, a medium-pressure turbine 14 and a low-pressure turbine 15. The energy released during combustion is used by the turbine TT to drive the fan F in order then to generate the required thrust by means of the air conveyed into the bypass duct B. During this process, the air leaves the bypass duct B in the region of an outlet A at the end of the engine T at which the exhaust gases flow outward out of the turbine TT. In this case, the outlet A usually has a thrust nozzle.

In principle, the fan F can also be coupled by a connecting shaft and an epicyclic planetary transmission to the low-pressure turbine 15 and can be driven by the latter. It is furthermore also possible to provide other gas turbine engines of different configuration in which the proposed solution can be used. For example, engines of this type can have an alternative number of compressors and/or turbines and/or an alternative number of connecting shafts. By way of example, the engine can have a split flow nozzle, meaning that the flow through the bypass duct B has its own nozzle that is separate from and radially outside the core engine nozzle. However, this is not limiting, and any aspect of the present disclosure may also apply to engines in which the flow through the bypass duct B and the flow through the core are mixed, or combined, before (or upstream of) a single nozzle, which may be referred to as a mixed-flow nozzle. One or both nozzles (whether mixed flow or split flow) may have a fixed or variable area. Whilst the described example relates to a turbofan engine, the proposed solution may be applied, for example, to any type of gas turbine engine, such as an open-rotor (in which the fan stage is not surrounded by a nacelle) or turboprop engine, for example.

In the variant of an engine T which is illustrated by way of example in the present case, the compressor V comprises a plurality of rows of rotor blades 110 situated axially in series and interposed rows of stator vanes 111 in the region of the low-pressure compressor 11. The rows of rotor blades 110, which rotate around the central axis M, and the rows of stationary stator vanes 111 are arranged alternately along the central axis M and accommodated in a (compressor) casing 1 of the compressor V. The individual stator vanes 111 are mounted adjustably on the single- or multi-part casing 1—generally in addition to radially inner mounting on the hub of the compressor V.

Figure 8:
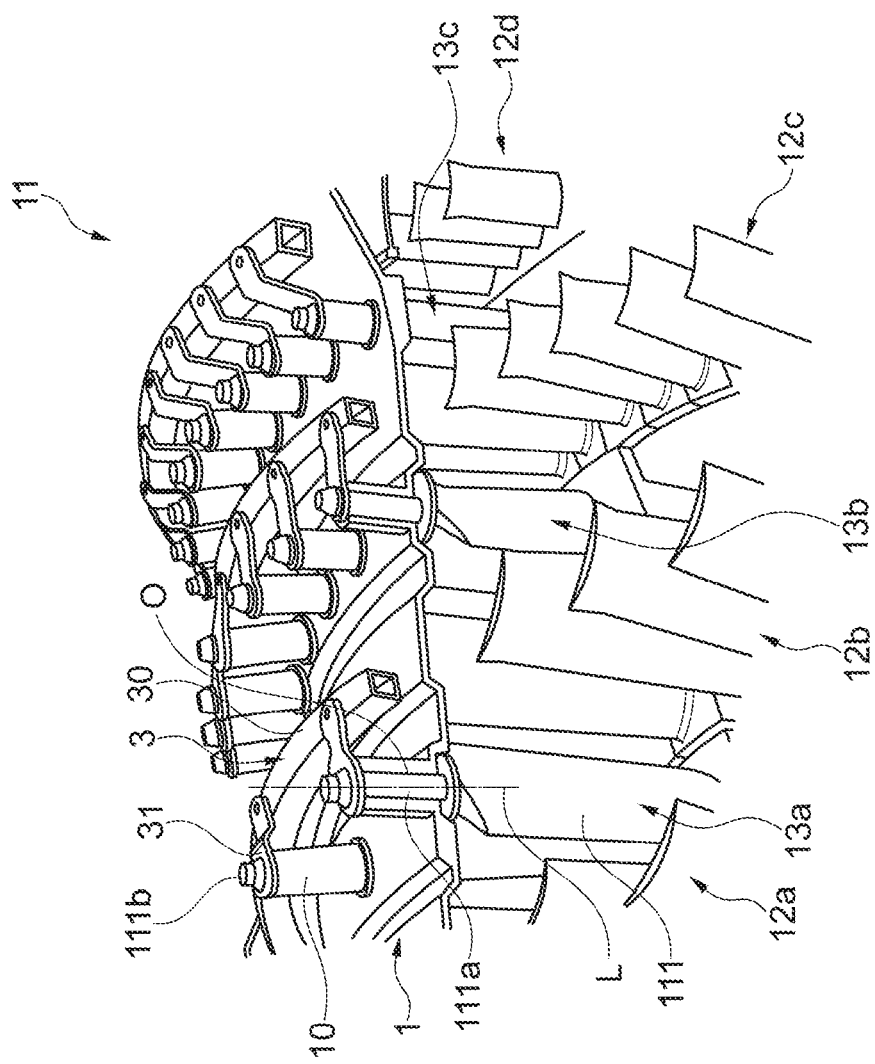
FIG. 8 shows a detail in perspective view of an arrangement known from the prior art comprising a plurality of stator vane assemblies, each having a stator vane row and a plurality of rotor blade assemblies.

Here, FIG. 8 shows a segment at a greater level of detail of an arrangement known from the prior art of rotor blade rows 12a to 12d and stator vane rows 13a to 13c for the low-pressure compressor 11. The stator vanes 111 of the stator vane rows 13a, 13b and 13c arranged in series are mounted adjustably on the casing 1 in order to enable the position of the stator vanes 111 to be changed in accordance with the compressor speed and inlet gas temperature. For this purpose, a bearing journal 111a of each rotor blade 111 is mounted rotatably in a bearing opening O, which is formed by a sleeve-shaped, radially outward-projecting bearing extension 10 of the casing 1. Each bearing journal 111a is rotatably mounted and supported in an associated bearing extension 10. In this arrangement, each bearing journal 111a passes through its associated bearing extension 10 along a longitudinal axis L, with the result that one journal end 111b projects from the bearing extension 10 on the outside of the casing 1.

It is thus possible for a respective adjusting lever 31 of an adjusting device 3 to act on the individual journal ends 111b to enable the bearing journal 111a to be rotated and thus the position of the associated stator vane 111 to be changed. In this arrangement, the levers 31 of a stator vane row 13a, 13b or 13c are each articulated on an adjusting element in the form of an adjusting ring 30 of the adjusting device 3. The adjusting ring 30—which is often in several parts and divided into at least two segments—extends circumferentially along the outer lateral surface of the casing 1. By adjusting the adjusting ring 30, it is thus possible to adjust the adjusting levers 31 articulated thereon and to adjust several (usually all) of the stator vanes 111 of a stator vane row 13a, 13b or 13c. Here, the individual adjusting rings 30 for the individual stator vane rows 13a, 13b and 13c are generally adjustable independently of one another.

Owing to component tolerances, wear during the operation of the engine T and the necessity of preserving a clearance in the region of the adjustable bearing journal 111a within the bearing opening O, there is in practice often an unwanted leakage flow out of an annular space RR (in which the stator vane rows 13a-13d are arranged) in the interior of the casing 1 toward the outside, as a result of which the mass flow in the core engine may possibly be reduced only slightly but not inconsiderably.

In a variant embodiment, illustrated in FIG. 1A, of a proposed stator vane assembly, such unwanted leakage flow is reduced or even completely avoided by an additionally provided sealing element in the form of a sealing bush 4. The sealing bush 4 has a bearing section in the form of a collar-shaped bush rim 41 via which the sealing bush 4 rests on an inner rim surface 10b, which is situated radially on the inside in relation to the central axis M and thus faces the annular space RR. From this bush rim 41, a stem section 40 extends into the interior of the bearing opening O, said section in the present case having a plurality of (at least two) rows of sealing ridges 400 which project radially (in relation to the longitudinal axis L) and extend around the longitudinal axis L.

The sealing ridges 400 each project in the direction of the bearing journal 111a from an inner lateral surface of the stem section 40 and each extend with a tapering end region into a recess 111.4 in the bearing journal 111a.

In the present case, a narrow clearance g1 is provided between an inner lateral surface 100 of the bearing extension 10 of the casing 1 in the bearing opening O and an outer lateral surface of the stem section 40. By virtue of the sealing contact of the bush rim 41 on the inner rim surface 10b, however, a flow to the outside via this clearance g1 is avoided. As an alternative, a press fit can be provided for the stem section 40.

Admittedly, there continues to be a clearance g2 between the inner lateral surface of the stem section 40 and an outer lateral surface of the bearing journal 111a for the rotatable mounting of the bearing journal 111a in the bearing opening O. However, a labyrinth seal, by means of which a leakage flow along the longitudinal axis L to the outside is avoided, is formed here by means of the plurality of rows of sealing ridges 400 and the recesses 111.4 provided in the bearing journals 111a.

The sealing bush 4 is in two parts with two bush halves (or half bushes), which are separated from one another by two longitudinally extending slots 401, with the result that the two bush halves adjoin one another along the slots 401 in the assembled state. In the case of a sealing bush 4 designed as a single part, the sealing bush 4 is longitudinally slotted in a manner similar to the individual illustrations in FIGS. 1B and 1C to enable the sealing bush 4 to be mounted on the bearing journals 111a. By means of these slots 401, the sealing bush 4 can be expanded for assembly on the bearing journals 111a. A temperature-induced expansion of the mounted sealing bush 4, particularly in the region of the stem section 40, is furthermore allowed by the slots 401.

In order to avoid the sealing action of the sealing bush 4 being negatively affected by the provision of the slots 401, each slot 401 has a nonlinear, discontinuous path, with the result that circumferential sections 40a and 40b of the stem section 40 which belong to different bush halves overlap one another at least partially in the axial direction. In the variant embodiment in FIGS. 1A to 1C, the slot 401 is in each case of Z-shaped design.

It should furthermore be noted that the sealing bush 4 is provided at a radially inner end of the bearing opening O in relation to the central axis M, in addition to a bearing bush 2, by means of which the bearing journal 111a is rotatably mounted within the bearing opening O. This bearing bush 2 has a collar-shaped bush rim, which is fixed by means of an (optional) adhesive surface 20 on the underside thereof on a radially outer rim surface 10a of the bearing extension 10. In this way, the bearing bush 2 is also fixed in a sealing manner on the bearing extension 10 and, consequently, there is only a clearance between an inner lateral surface of the bearing bush 2 and an outer lateral surface of the bearing journal 111a.

Figure 2:
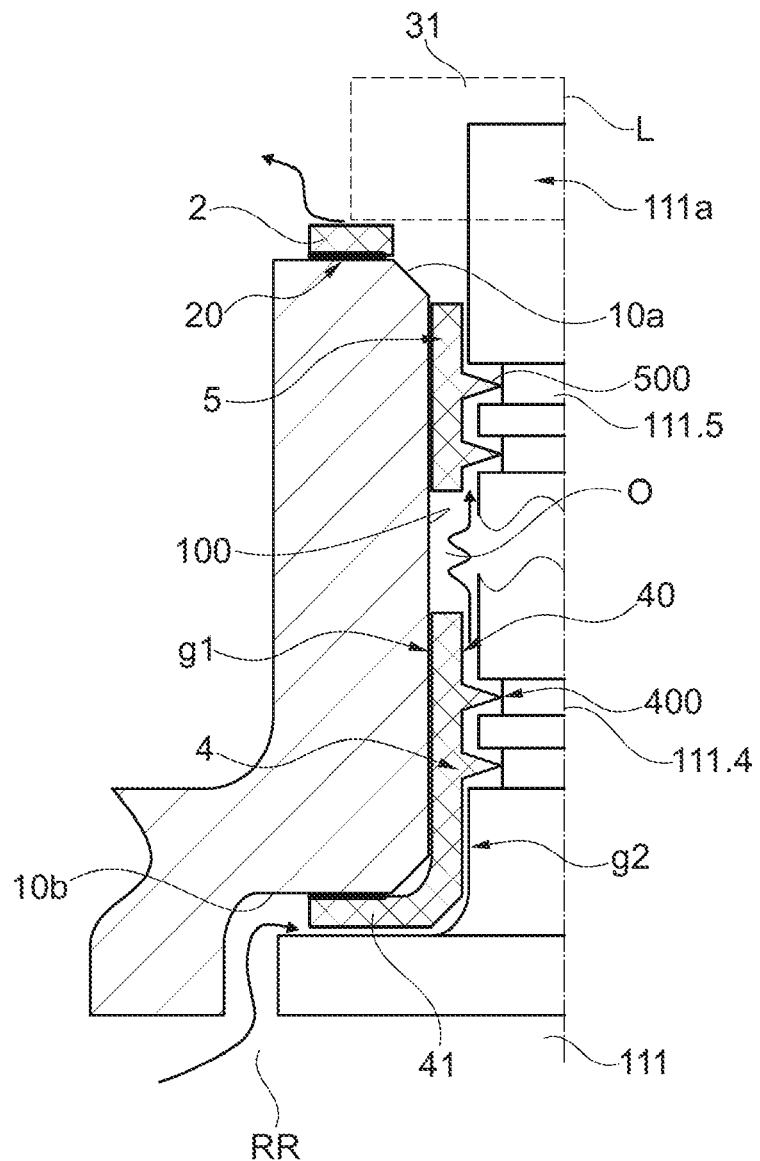
FIG. 2 shows another variant embodiment of a proposed stator vane assembly in a view corresponding to that in FIG. 1A, wherein two separate bush-shaped sealing elements are provided.

In the variant embodiment in FIG. 2, an additional sealing element in the form of a further sealing bush 5 is provided along the longitudinal axis L in addition to the sealing bush 4. This further sealing bush 5 likewise has a plurality of sealing ridges 500 extending circumferentially around the longitudinal axis L and projecting radially in relation to the longitudinal axis L. These sealing ridges 500, which taper in the direction of the bearing journal 111a, likewise extend into additionally provided recesses 111.5 in the bearing journal 111a and thus define an additional labyrinth seal on the outer lateral surface of the bearing journal 111a at a distance from the sealing bush 4 and the sealing ridges 400 thereof.

Instead of a bearing bush, a bearing washer 2 is provided by way of example in the radially outer rim surface 10a in the variant embodiment in FIG. 2. This bearing washer 2 too is fixed on the end-located rim surface 10b by means of an (optional) adhesive surface 20. By means of the bearing washer 2 in FIG. 2, only axial mounting of the adjusting lever 31 is thus provided (as also with the bush rim of the bearing bush 2) but not rotatable mounting of the bearing journal 111a. Thus only the sealing bushes 4 and 5 are provided for the rotatable mounting of the bearing journal 111a within the bearing opening O.

Figure 3:
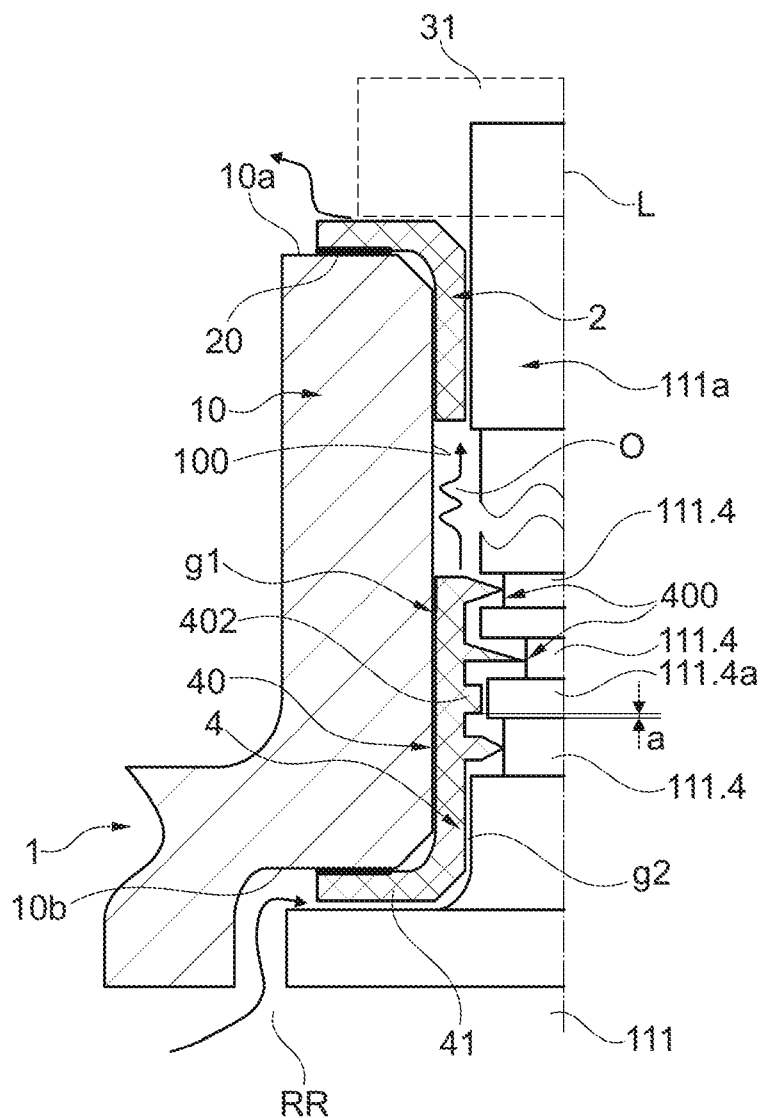
FIG. 3 shows a stator vane assembly having a bush-shaped sealing element, illustrating radially extending sealing ridges of different configurations, in a view corresponding to that in FIGS. 1A and 2.

In the variant embodiment in FIG. 3, only a single sealing element in the form of a sealing bush 4 having a plurality of rows of sealing ridges 400 is provided in addition to the bearing bush 2. In the variant embodiment in FIG. 3, different geometries of sealing ridges 400 are illustrated here, tapering in an arrow or wedge shape in the direction of the bearing journal 111a and projecting into associated recesses 111.4 in order to define a labyrinth seal along the bearing journal 111a.

In addition to the sealing ridges 400 projecting into recesses 111.4, the sealing bush 4 in FIG. 3 also has at least one additional shortened radial sealing ridge 402 on its stem section 40. This shortened radial sealing ridge 402 lies opposite a shoulder 111.4a of the bearing journal 111.4. Consequently, the diameter of the bearing journal 111a is enlarged at this shoulder 111.4a, in particular relative to a recess 111.4 adjoining it along the longitudinal axis L. In this arrangement, the shortened radial sealing ridge 402 and the shoulder 111.4a are offset relative to one another by a step spacing a along the longitudinal axis L, with the result that the rims of the shortened radial sealing ridge 402 and of the shoulder 111.4a are not in alignment. A clearance extending along the longitudinal axis L and across the different sealing ridges 400 and 402 between the sealing bush 4 and the outer lateral surface of the bearing journal 111a thus winds several times by different amounts in opposite directions. The sealing action can thus be additionally enhanced by means of the additionally provided shortened radial sealing ridge 402 and the shoulder 111.4a.

Figure 4:
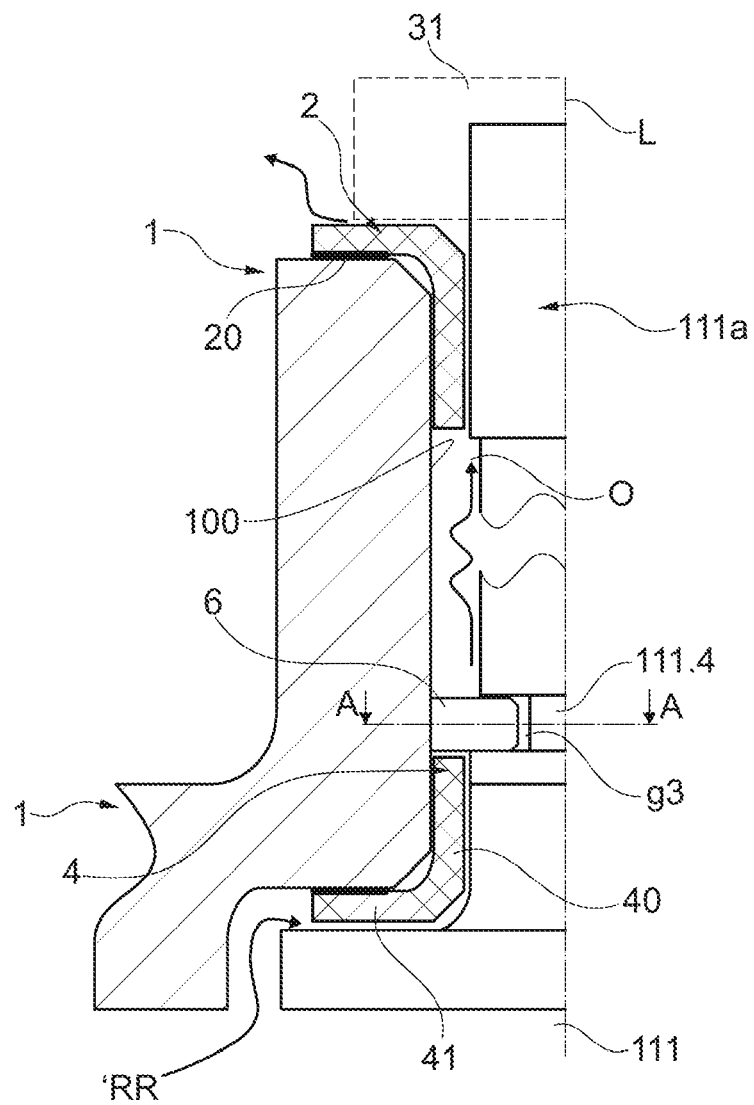
FIG. 4 shows another variant embodiment of a proposed stator vane assembly having a disk-shaped, longitudinally slotted sealing element, in a view corresponding to that in FIGS. 1A, 2 and 3.
Figure 4A:
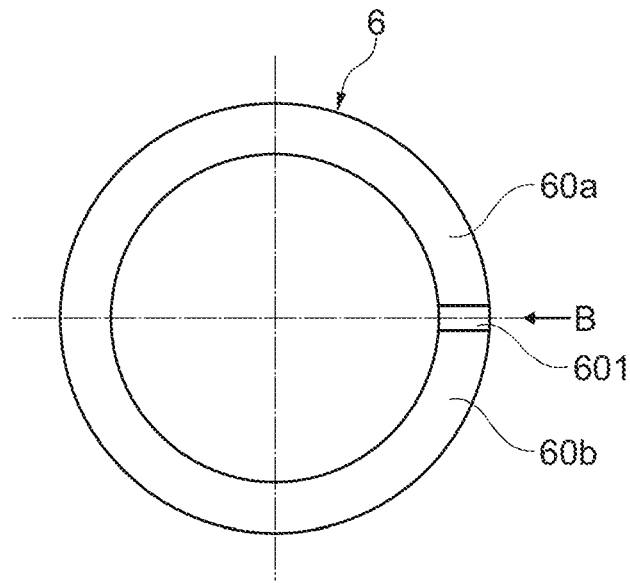
FIG. 4A shows the disk-shaped sealing element in an isolated view in a section along a section line A-A in FIG. 4.

In the variant embodiment in FIG. 4, the sealing bush 4 is formed without radially projecting sealing ridges on its stem section 40 and is thus provided more as a bearing bush. In this variant, the sealing action to avoid leakage flow is achieved more by means of a sealing washer 6, which is arranged in addition to the bearing bush 2 and the sealing bush 4 on the radially outer and inner ends of the bearing opening O and between the bushes 2 and 4. This sealing washer 6 (or sealing ring) is accommodated in a recess 111.4 of the bearing journal 111a in order thereby to make available a kind of labyrinth seal in this variant embodiment too.

In order to take account of a thermally induced expansion of the sealing washer 6 during operation, a narrow clearance g3 is provided between an inner lateral surface of the sealing washer 6 and the outer lateral surface of the bearing journal 111a, in the region of the recess 111.4.

Figures 4B, 4C, 4D, 4E:
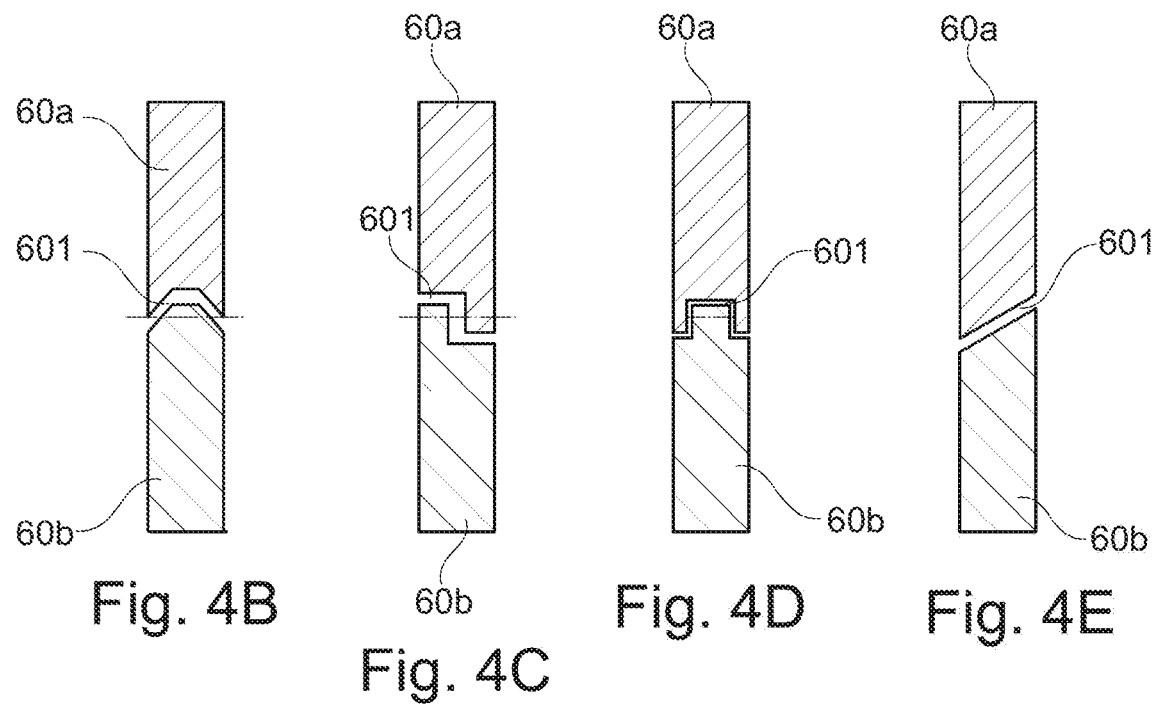
FIGS. 4B-4E show a side view of the disk-shaped sealing element with a V-, Z-, Ω-shaped or helical slot in the disk-shaped sealing element along a line of sight B corresponding to FIG. 4A.

To enable the sealing washer 6 to be mounted on the bearing journal 111a, the sealing washer 6 is also longitudinally slotted. In this case, a single longitudinal slot 601 once again has a nonlinear path, with the result that two circumferentially extending sections of the circumference 60a and 60b of the sealing washer 6, which are separated from one another by the slot 601, overlap one another axially and/or fit into one another. For this purpose, the profile of the slot 601 can be V-shaped in accordance with FIG. 4B, Z-shaped in accordance with FIG. 4C, Ω-shaped in accordance with FIG. 4D or helical (around the longitudinal axis L) in accordance with FIG. 4E, for example. It is of course also possible here for the profiles of a slot 601 which are shown by way of example in FIGS. 4B, 4C, 4D and 4E to be provided for a slot 401 in a sealing bush 4 (or in the sealing bush 5) of the variant embodiments explained above.

In the present case, the sealing washer 6 is designed in such a way that the sealing washer 6 rests against and thus seals the inner wall or lateral surface 100 of the bearing opening O via its outer lateral surface under the conditions which arise during the operation of the engine T. Owing to the positioning on the recess 111.4 in the bearing journal 111a, there is an overlap with the sealing washer 6 when viewed in the axial direction, and this has a sealing effect, in particular a sealing effect under all (transient) thermal conditions. In this context, the longitudinally extending slot 601 is designed to compensate the thermal behavior and nevertheless to provide sealing in addition.

Figure 5A:
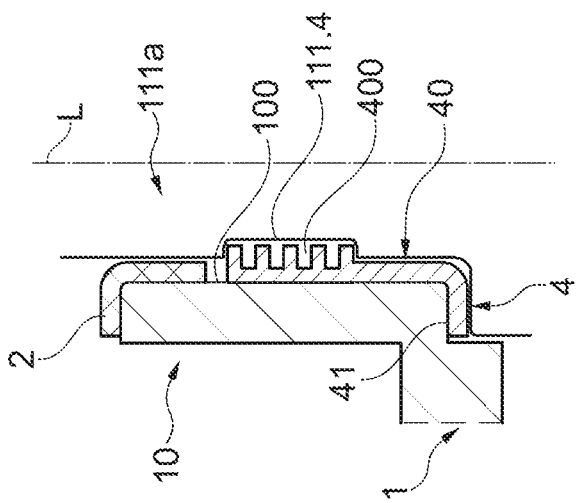
FIGS. 5A-5C show further variant embodiments of a proposed stator vane assembly having different bush-shaped sealing elements, each having a plurality of rows of radially extending sealing ridges, in each case in a longitudinally sectioned view.

FIGS. 5A/5D, 5B/5E and 5C/5F illustrate further variant embodiments of a proposed stator vane assembly.

Figure 5D:
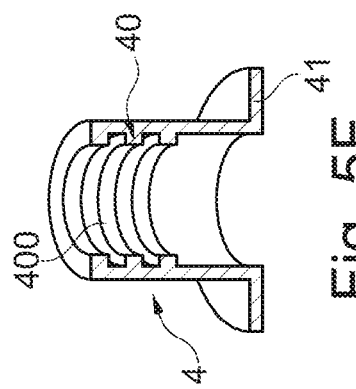
FIGS. 5D-5F show perspective sectioned views of the bush-shaped sealing elements in FIGS. 5A, 5B and 5C.

In the variant embodiment illustrated in FIGS. 5A and 5D, a sealing bush 5 having a plurality of rows of a radially extending sealing ridges 500 is arranged between the bearing bush 2 and a sealing bush 4 without radially extending sealing ridges, embodied as an additional bearing bush. This bearing bush 5 is of two-part design, having two bush halves for example, and is mounted in a recess 111.5 in the bearing journal 111a. In this case, the individual sealing ridges 500 extend radially inward in relation to the longitudinal axis L.

Figure 5B:
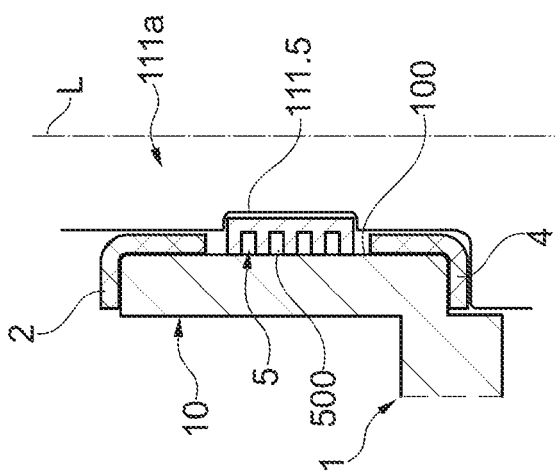
Figure 5E:
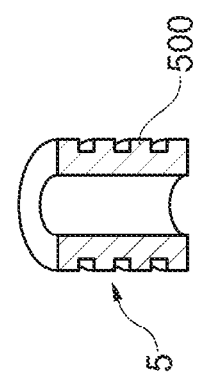

In the variant embodiment in FIGS. 5B and 5E, in contrast, a sealing bush 5 is arranged between bushes 2 and 4, in a recess 111.5 in the bearing journal 111a, and on this bush the plurality of rows of sealing ridges 500 extend radially outward. A labyrinth seal is thus defined in the region between the inner lateral surface 100 at the bearing opening O and the sealing ridges 500 of the sealing bush 5.

Figure 5C:
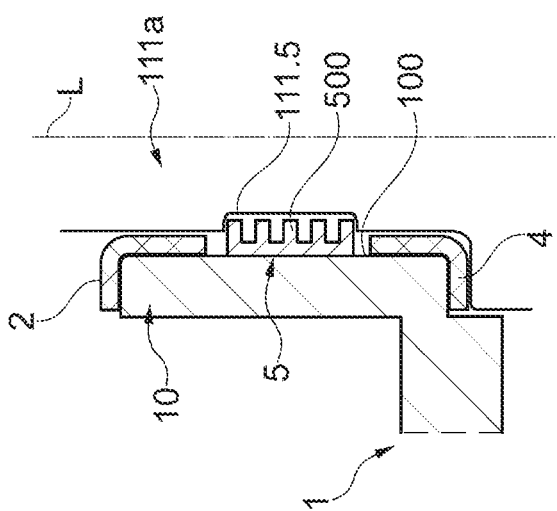
Figure 5F:
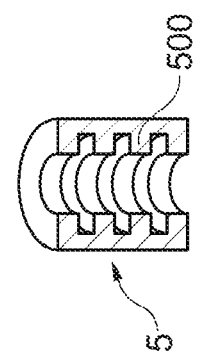

In the variant embodiment in FIGS. 5C and 5F, a sealing bush 4 is formed in a manner comparable to the variant embodiment in FIGS. 1A to 1C. Here, the sealing bush 4 comprises a plurality of rows of radially extending sealing ridges 400 on a stem section 40 extending from the bush rim 41 into the bearing opening O along the longitudinal axis L. In this case, the sealing bush 4 is in two parts.

Figure 6B:
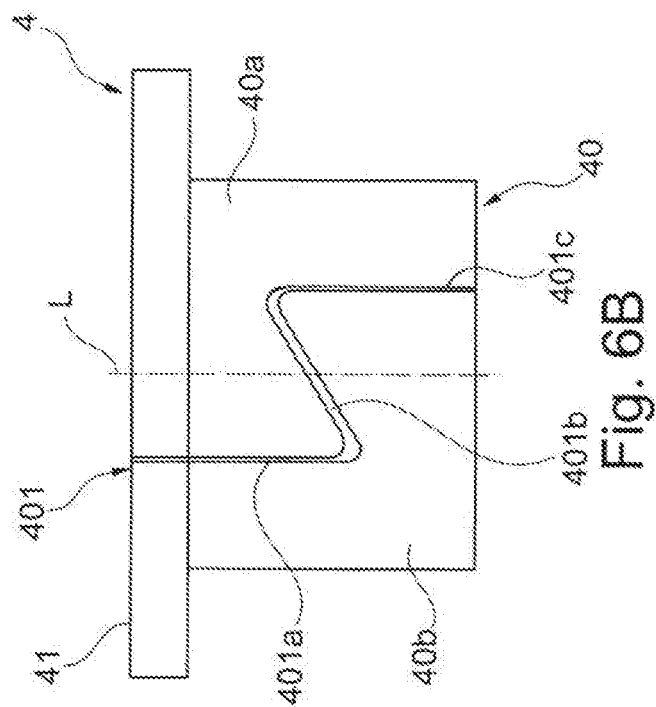
FIGS. 6A-6B show one variant embodiment of a bush-shaped sealing element having a Z-shaped slot under two different thermal boundary conditions in side view.
Figure 6A:
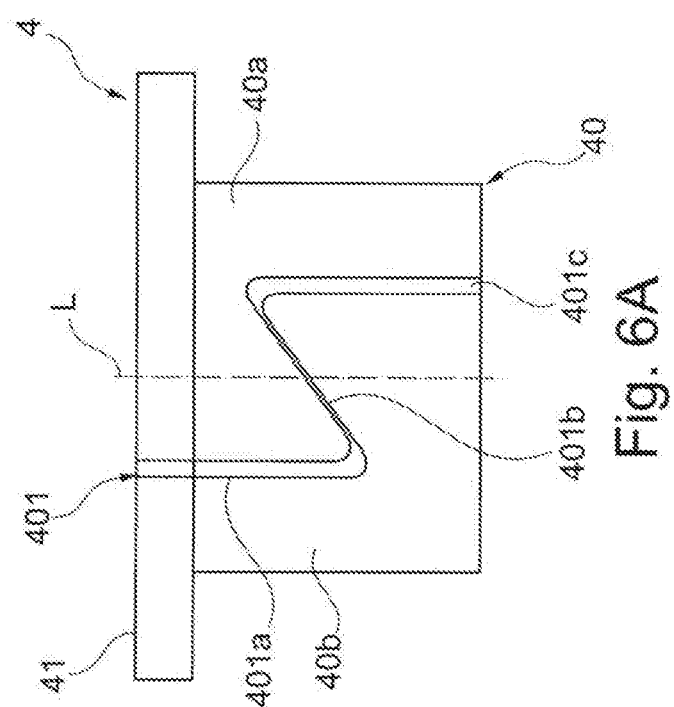

FIGS. 6A and 6B show another variant embodiment of a two-part sealing bush 4, where the sections of the circumference 40a and 40b belonging to different bush halves or parts are separated from one another by a Z-shaped longitudinal slot 401 and adjoin one another in the assembled state. FIGS. 6A and 6B show the sealing bush 4 under two different thermal boundary conditions.

In a cold state corresponding to FIG. 6A, the mutually overlapping sections of the circumference 40a, 40b of the sealing bush 4 rest against one another or at least almost rest against one another in the region of a central (second) slot section 401b. This central slot section 401b forms a transition from a first slot section 401a and a third slot section 401c, which each extend substantially parallel to the longitudinal axis L.

At a relatively high temperature and thus under a relatively high thermal stress, the parts of the sealing bush 4 and thus the sections of the circumference 40a, 40b thereof expand in the circumferential direction. The slot sections 401a and 401c are thereby closed. In contrast, a (larger) clearance is formed between the mutually adjoining parts of the sealing bush 4 in the region of the central, obliquely extending slot section 401b. During the operation of the engine T, the slot 401 is thus closed (in a sealing manner) in the region of its slot sections 401a and 401b. Consequently, the multi-part sealing bush 4 in FIGS. 6A and 6B (and similarly also the sealing elements 4, 5 and 6 explained above) can be configured and designed in such a way that the slot 401 in the sealing bush 4 closes during the operation of the engine T as a result of the thermal expansion which occurs.

In the above-explained variant embodiments of stator vane assemblies, a leakage flow to the outside from the annular space RR along the bearing journal 111A, through the bearing opening O in the casing 1, is avoided in an effective manner by means of at least one bush-shaped or disk-shaped sealing element 4, 5, 6. In order to ensure low friction contact between the sealing element 4, 5 and/or 6—which is subject to high thermal stresses during the operation of the engine T—, on the one hand, and the outer lateral surface of the bearing journal 111a and/or the inner lateral surface 100 of the bearing opening O, on the other hand, the respective sealing element 4, 5, 6 can be produced, for example, from a plastics material with good sliding properties, e.g. a thermoplastic, polyamide, a polyamideimide, a polyimide, in each case either with or without graphite infiltration and with or without a PTFE component. Alternatively, the use of infiltrated graphite for the sealing elements with a relatively high usage temperature is also among the possible options.

LIST OF REFERENCE SIGNS

1 Casing
10 Bearing extension
100 Inner lateral surface
10a Radially outer rim surface
10b Radially inner rim surface
11 Low-pressure compressor
110 Rotor blade
111 Stator vane
111.4 Recess
111.4a Shoulder
111.5 recess
111a Bearing journal
111b Journal end
12 High-pressure compressor
12a-12d Rotor blade row
13 High-pressure turbine
13a-13c Stator vane row
14 Medium-pressure turbine
15 Low-pressure turbine
2 Bearing bush/bearing washer
20 Adhesive surface
3 Adjusting device
30 Adjusting ring
31 Adjusting lever
4 Sealing bush (sealing element)
40 Stem section
400 Radial sealing ridge
401 Slot
401a, 401b, Slot section
401c
402 (Shortened) radial sealing ridge
40a, 40b Section of the circumference
41 Bush rim (bearing section)
5 Sealing bush (sealing element)
500 Radial sealing ridge
6 Sealing washer (sealing element)
601 Slot
60a, 60b Section of the circumference
A Outlet
A Step spacing
B Bypass duct
BK Combustor section
D Axis of rotation/spindle axis
E Inlet/Intake
F Fan
g1, g2, g3 Clearance
I Interior
L Longitudinal axis
M Central axis/axis of rotation
O Bearing opening
R Inlet opening
RR Annular space
T Gas turbine engine
TT Turbine
V Compressor

The invention claimed is:

1. A stator vane assembly for an engine, comprising:
a stator vane of a stator vane row, the stator vane including a bearing journal;
a casing for the stator vane row, the casing including a bearing opening;
wherein the stator vane is mounted adjustably on the casing by the bearing journal, which is rotatably mounted in the bearing opening and passes through the bearing opening along a longitudinal axis;
a sealing element positioned in the bearing opening between the casing and the bearing journal, the sealing element including a sealing section having at least one chosen from:
at least one sealing ridge extending radially in relation to the longitudinal axis, and
a longitudinally extending nonlinear slot;
wherein the sealing element includes the at least one sealing ridge;
wherein the at least one sealing ridge includes two sealing ridges, which are arranged in series along the longitudinal axis;
wherein the bearing journal includes at least one radially inwardly extending recess and wherein the two sealing ridges extend into the at least one radially inwardly extending recess in the bearing journal.

2. The stator vane assembly according to claim 1, wherein the sealing element forms a labyrinth seal to avoid a leakage flow through the bearing opening and along the bearing journal.

3. The stator vane assembly according to claim 1, wherein the at least one sealing ridge tapers in a direction of the bearing journal in at least one ridge section.

4. The stator vane assembly according to claim 1, wherein the at least one sealing ridge has an end region which rests in frictional engagement against an outer lateral surface of the bearing journal and which is configured to be scraped off at least partially by adjustment of the bearing journal around the longitudinal axis during operation of the engine.

5. The stator vane assembly according to claim 1, wherein the bearing journal includes a recess and the sealing section includes the at least one sealing ridge, with the sealing section being accommodated in the recess in the bearing journal, and the at least one sealing ridge extending radially outward in a direction of an inner lateral surface of the bearing opening.

6. The stator vane assembly according to claim 1, wherein, the sealing element further includes a bearing section, via which the sealing element rests against a rim surface of the casing, the rim surface being situated radially on an inside in relation to a central axis of the stator vane row and forming a boundary of the bearing opening.

7. The stator vane assembly according to claim 1, and further comprising a second one of the sealing element.

8. The stator vane assembly according to claim 1, wherein the sealing element has a bush-shaped or disk-shaped configuration.

9. The stator vane assembly according to claim 1, wherein the sealing element includes the nonlinear slot and the nonlinear slot has a discontinuous path.

10. The stator vane assembly according to claim 1, wherein the sealing element includes the nonlinear slot and the nonlinear slot has a helical, Z-, V- or Ω-shaped path.

11. The stator vane assembly according to claim 1, wherein the sealing element is of multi-part design, and two parts of the sealing element adjoin one another along the nonlinear slot.

12. A gas turbine engine having a stator vane assembly according to claim 1.

13. The stator vane assembly according to claim 1, wherein the bearing journal includes two radially inwardly extending recesses and wherein the two sealing ridges extend into the two recesses, respectively.

14. A stator vane assembly for an engine, comprising:
a stator vane of a stator vane row, the stator vane including a bearing journal;
a casing for the stator vane row, the casing including a bearing opening;
wherein the stator vane is mounted adjustably on the casing by the bearing journal, which is rotatably mounted in the bearing opening and passes through the bearing opening along a longitudinal axis;
a sealing element positioned in the bearing opening between the casing and the bearing journal, the sealing element being disc shaped with a radially outwardly facing surface of the sealing element lying sealingly flat against a radially inwardly facing surface of the bearing opening;
wherein the sealing element includes the nonlinear slot and the nonlinear slot has a helical, Z-, V- or Ω-shaped path.

15. A stator vane assembly for an engine, comprising:
a stator vane of a stator vane row, the stator vane including a bearing journal;
a casing for the stator vane row, the casing including a bearing opening;
wherein the stator vane is mounted adjustably on the casing by the bearing journal, which is rotatably mounted in the bearing opening and passes through the bearing opening along a longitudinal axis;
a sealing element positioned in the bearing opening between the casing and the bearing journal, the sealing element including a sealing section having at least one chosen from:
at least one sealing ridge extending radially in relation to the longitudinal axis, and
a longitudinally extending nonlinear slot;
wherein the sealing element includes the at least one sealing ridge;
wherein the at least one sealing ridge includes two sealing ridges, which are arranged in series along the longitudinal axis;
wherein the sealing element is of multi-part design, and two parts of the sealing element adjoin one another along the nonlinear slot.

* * * * *